(12) United States Patent  
Sasaki et al.

(10) Patent No.: US 7,383,029 B2
(45) Date of Patent: Jun. 3, 2008

(54) TRANSMITTER HAVING AN INNER PLATE FOR PREVENTING AN ELECTRONIC SUBSTRATE FROM COMING OFF

(75) Inventors: Satoru Sasaki, Iida (JP); Manabu Sakai, Iida (JP)

(73) Assignee: OMRON Corporation, Kyoto (JP)

( * ) Notice: Subject to any disclaimer, the term of this patent is extended or adjusted under 35 U.S.C. 154(b) by 468 days.

(21) Appl. No.: 10/997,072

(22) Filed: Nov. 24, 2004

(65) Prior Publication Data

US 2005/0143029 A1   Jun. 30, 2005

(30) Foreign Application Priority Data

Nov. 28, 2003 (JP) ............... 2003-398888

(51) Int. Cl.
*H04B 1/034* (2006.01)
(52) U.S. Cl. ............ 455/128; 455/90.3; 455/347; 379/419; 361/752
(58) Field of Classification Search ........ 455/128, 455/90.3, 352, 301, 347; 379/419, 433.01, 379/433.03; 361/752
See application file for complete search history.

(56) References Cited

U.S. PATENT DOCUMENTS

| | | | | |
|---|---|---|---|---|
| 5,722,055 A * | 2/1998 | Kobayashi et al. | ...... | 455/575.8 |
| 5,914,218 A * | 6/1999 | Smith et al. | ...... | 430/320 |
| 6,361,331 B2 * | 3/2002 | Fork et al. | ...... | 439/81 |
| 6,621,714 B1 * | 9/2003 | Li et al. | ...... | 361/801 |
| 7,072,624 B2 * | 7/2006 | Zheng et al. | ...... | 455/90.3 |
| 7,149,481 B2 * | 12/2006 | Okako et al. | ...... | 455/90.3 |
| 7,224,953 B2 * | 5/2007 | Hosoi | ...... | 455/301 |
| 2002/0126461 A1 * | 9/2002 | Yazaki | ...... | 361/752 |
| 2003/0235297 A1 * | 12/2003 | Cheng et al. | ...... | 379/441 |
| 2004/0090745 A1 * | 5/2004 | Mueller et al. | ...... | 361/704 |
| 2004/0136161 A1 * | 7/2004 | Miyamura et al. | ...... | 361/705 |
| 2004/0203514 A1 * | 10/2004 | Cheng et al. | ...... | 455/90.3 |

FOREIGN PATENT DOCUMENTS

JP            2001339176 A  * 12/2001

* cited by examiner

*Primary Examiner*—Edward F. Urban
*Assistant Examiner*—Junpeng Chen
(74) *Attorney, Agent, or Firm*—Osha-Liang LLP (57) ABSTRACT

A transmitter having a structure causing no complicated manufacturing process and no damage of a sealing rubber and capable of certainly preventing an electronic substrate from coming off in exchanging a battery is provided. An inner plate is a component, which has a bending type of unseparated segmentation structure and which is molded into one body, and the inner plate is molded with protruded portions engaging with grooves formed in an inner surface of an upper case and elastic pieces engaging with a periphery of the electronic substrate. The bent inner plate is placed on the electronic substrate and a force for canceling the bending state is added so that the protruded portions would engage with the grooves of the upper case and the elastic pieces would engage with the periphery of the electronic substrate.

1 Claim, 6 Drawing Sheets

(Prior Art)

FIG. 5

(Prior Art)

FIG. 6

(Prior Art)

TRANSMITTER HAVING AN INNER PLATE FOR PREVENTING AN ELECTRONIC SUBSTRATE FROM COMING OFF

BACKGROUND OF THE INVENTION

1. Field of the Invention

The present invention relates to a transmitter, particularly, a transmitter for a remote keyless entry system, for example, which is required to have a certain waterproof function for exclusive outdoor use and to be easy to carry out an operation of exchanging a built-in battery, the operation being necessary even though it is not frequently required.

2. Description of Related Art

A remote keyless entry system is a convenient system in which operating only a push button of a transmitter housed in a case as small as a matchbox allows a door to be locked or unlocked without using any mechanical key. There is also a developed type of system in which no operation of pushing a push button of a transmitter is necessary. In the developed type of system, a door of a vehicle can be locked or unlocked by pushing an entry button of the door of a vehicle with a transmitter putted on. Accordingly, it is not necessary to take out the transmitter from a pocket every time.

Such transmitters are all used outdoors, and thus, a waterproof countermeasure against rain and such is essential. Moreover, they are operated by means of a disposable battery, and therefore, it should be considered whether an operation of exchanging the battery is easy to perform or not.

Figure 4:
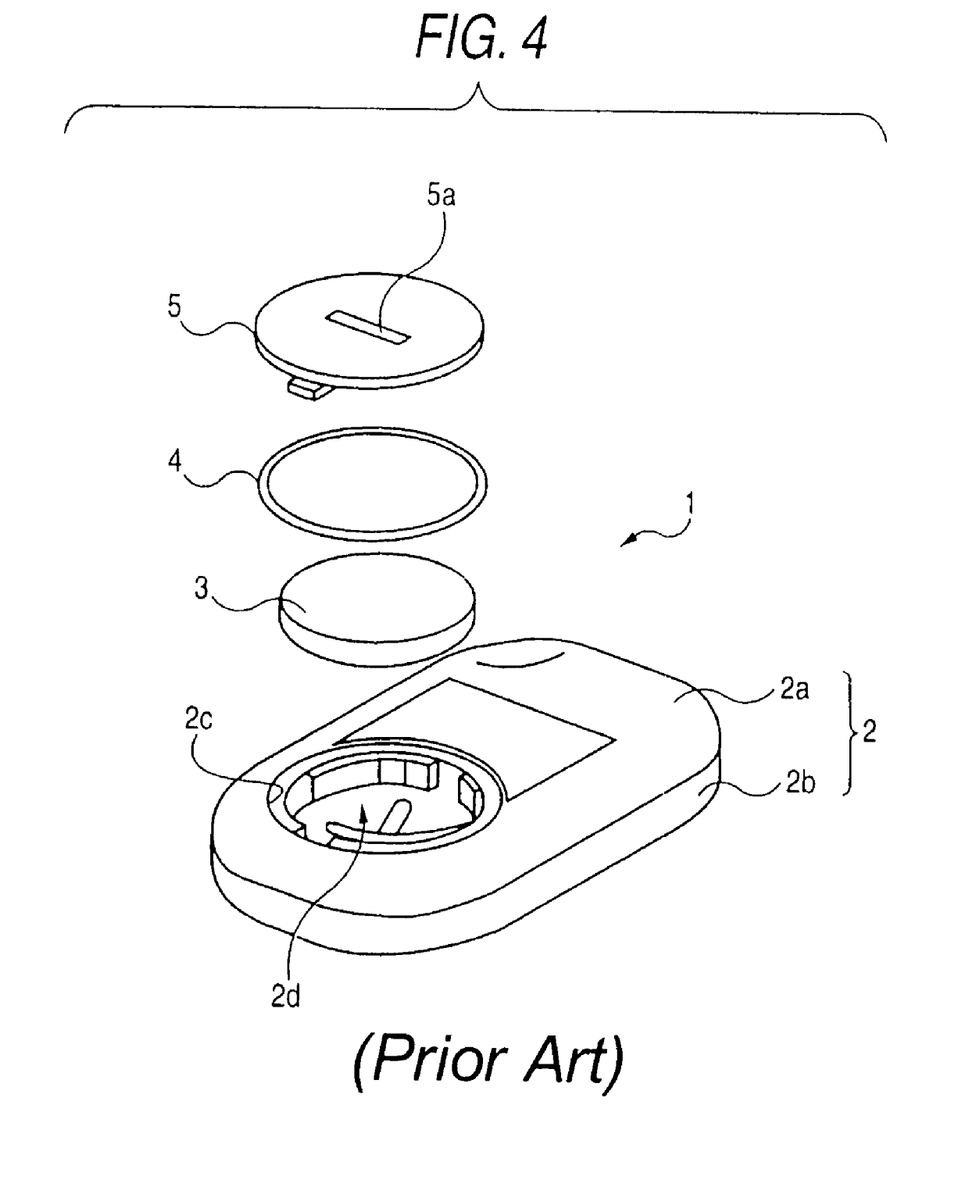
FIG. 4 shows a first conventional example.

FIG. 4 shows a first conventional example. FIG. 4 shows a structure similar to the one introduced in Paragraphs [0038] to [0039] in JP-A-11-81762. In FIG. 4, a transmitter 1 includes a main body portion 2, which comprises cases 2a and 2b divided into upper and lower two parts and which is as small as a matchbox, a battery 3, which is housed in a battery housing portion 2d in the main body portion 2 through a battery housing hole 2c formed in a bottom of the case 2a, an O-ring 4 for waterproofing mounted on the periphery of the battery housing hole 2c and a circular rid 5 for closing the battery housing hole 2c with the O-ring 4 inserted therebetween. On a surface of the case 2b (a surface on the back side, which is not shown), provided are various kinds of push button such as a locking button and an unlocking button, for example.

An advantage of the first conventional example is that an operation of exchanging the battery 3 is easy. That is to say, fitting a familiar coin or such in a groove 5a of the circular rid 5 and turning the coin allow the circular rid 5 to be easily taken off. The battery 3 can be thus exchanged without using any special tool.

On the other hand, the first conventional example has following disadvantages. First, the surface of the main body portion 2 has little free space, so that there is only a small space available for sticking an emblem of a manufacturer or a radio frequency identification sticker, for example. This causes little freedom in designing. Namely, on the surface of the case 2a, provided are the battery housing hole 2c and the circular rid 5 while various kinds of push button are provided on the surface of the case 2b, so that an emblem of a manufacturer, a radio frequency identification sticker or such can be stuck only in an extremely small range excluding the above components. This is one of disadvantages. Further, one of waterproofed parts of the transmitter 1 is a part located between the battery housing hole 2c of the case 2a and the circular rid 5. In the case that the O-ring 4 is improperly mounted or fails to be mounted in an operation of exchanging the battery 3, rain water or such would enter from the part, so that a trouble would be caused for an electronic substrate in the main body portion 2. This is another disadvantage.

Figure 5:
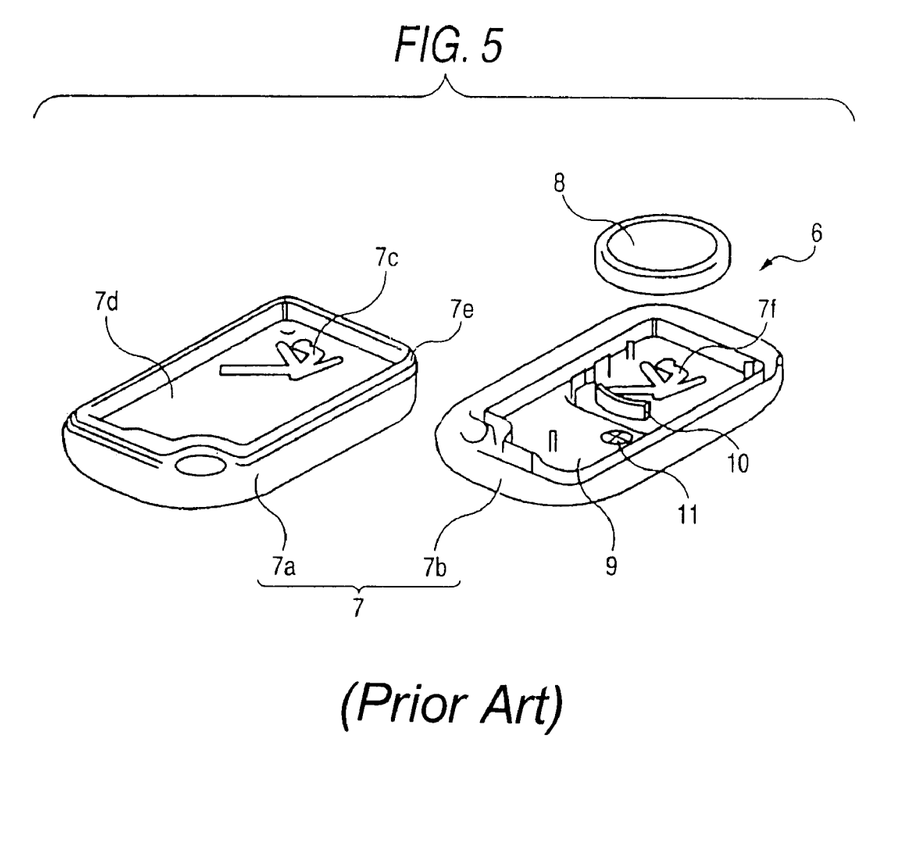
FIG. 5 shows a second conventional example.

FIG. 5 shows a second conventional example. FIG. 5 shows a structure similar to the one introduced in Paragraph [0042] in JP-A-2003-201781. In the second conventional example, a transmitter 6 also includes a main body portion 7, which comprises cases 7a and 7b divided into upper and lower two parts and which is as small as a matchbox, similar to the first conventional example described above. There is, however, no "circular rid for exchanging a battery" like the case of the first conventional example described above. The cases 7a and 7b divided into upper and lower two parts are arranged to be able to be disassembled whenever exchange of a battery 8 is necessary. Such a way of exchanging a battery is called a "case disassembling type".

In an inner surface of the case 7a, provided are a spring characteristic terminal 7c in contact with one electrode of a battery 8, a conductive sheet 7d electrically connected to the spring characteristic terminal 7c and a waterproof seal 7e on the periphery of an opening of the case 7a. On the other hand, in an inner surface of the case 7b, provided are a spring characteristic terminal 7f in contact with the other electrode of the battery 8, an electronic substrate 9 on which a predetermined electronic circuit is mounted, the electronic circuit using as a power source a terminal voltage of the battery 8 supplied through the above two spring characteristic terminals 7c and 7f to operate, and a holding body 10 for holding the periphery of the battery 8 to perform positioning.

In the second conventional embodiment, there is no circular rid for exchanging a battery, so that enough free space is secured on the surface of the main body portion 7. This leads to an advantage that the freedom for sticking an emblem of a manufacturer, a radio frequency identification sticker or such is large. Moreover, there is another advantage that elastic fitting (snap connection) between the cases 7a and 7b divided into upper and lower two parts allows the main body portion 7 to be easily disassembled by means of a coin or a nail in some cases, for example, without any special tool, so as to easily exchange the battery 8. Further, there is only one waterproof part between the cases 7a and 7b divided into upper and lower two parts (a waterproof seal 7e). Accordingly, fixed adhesion of the waterproof seal 7e prevents the waterproof seal 7e from coming off in an operation of exchanging the battery 8. This is also an advantage of the second conventional example. Many recent transmitters for a remote keyless entry system are, thus, of the case disassembling type because of the above advantages.

The above second conventional example (a case disassembling type of transmitter) has superior advantages that the freedom for sticking an emblem of a manufacturer, a radio frequency identification sticker or such is large, that battery exchange is easy and that a waterproof performance can be maintained. In the second conventional example, however, the cases 7a and 7b divided into upper and lower two parts are disassembled for exchanging the battery 8, so that the electronic substrate 9 sometimes comes off in an exchanging operation. In order to avoid the above, it is possible in some cases to take measures so that the electronic substrate 9 would be fixed to the case 7b by means of a screw 11, as shown in FIG. 5, for example. Such a measure by means of a screw, however, is not preferable since it causes a complicated manufacturing process.

Figure 6:
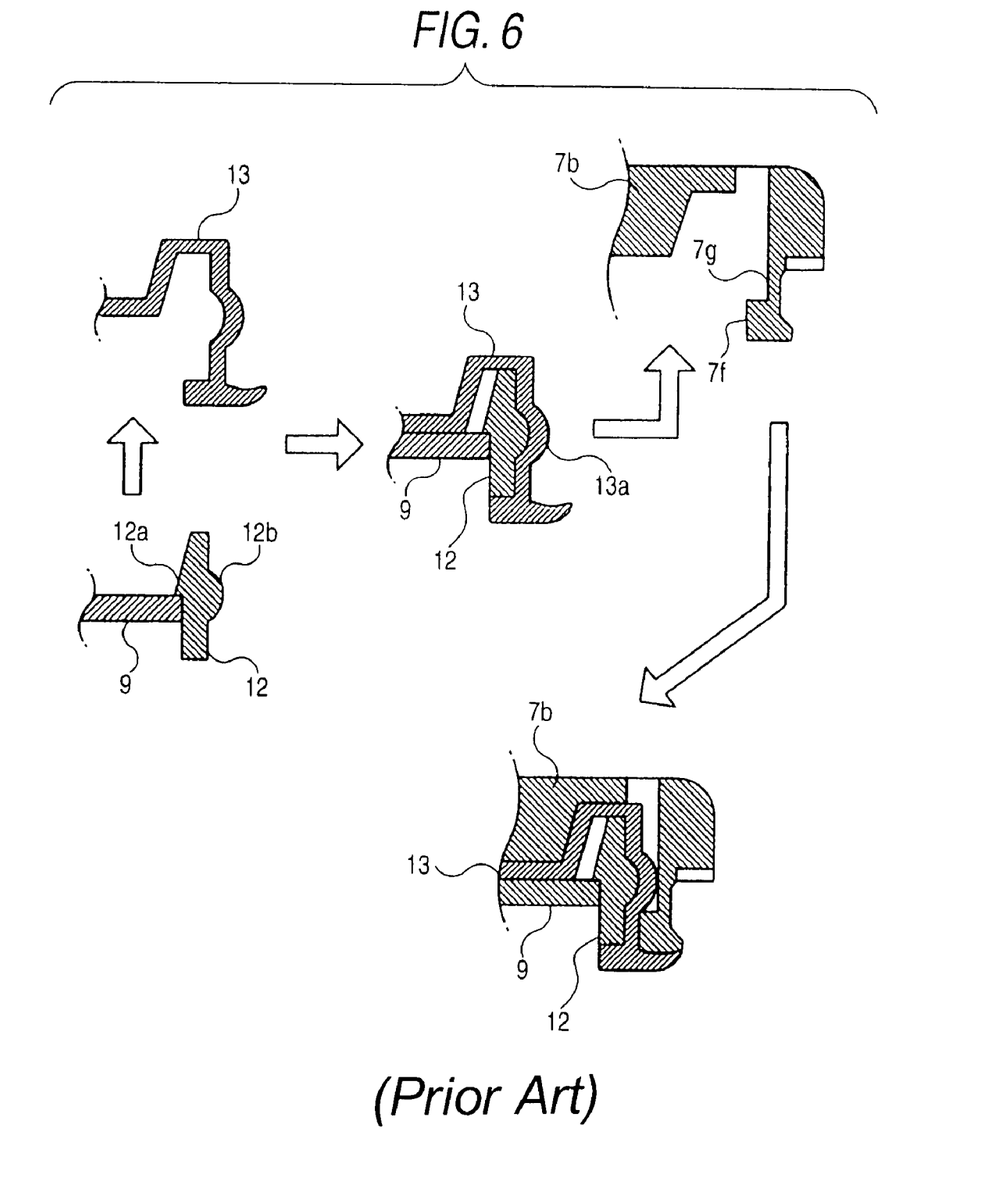
FIG. 6 is a sectional view of an integral part of a transmitter in assembling in a third conventional example.

FIG. 6 shows a third conventional example in which a structure is improved with respect to the above disadvantages. FIG. 6 is a sectional view of an integral part of a structure in assembling a transmitter, the structure being similar to the one introduced in Paragraphs [0012] to [0015] in JP-A-2001-339176. In FIG. 6, an elastic piece 12*a* of an inner case 12 is first engaged with a periphery of the electronic substrate 9 to fit the electronic substrate 9 and the inner case 12 into a sealing rubber 13 with the engagement maintained. The assembled body (the electronic substrate 9+the inner case 12+the sealing rubber 13) is then pushed into the case 7*b* so that a protrusion 13*a* of the sealing rubber 13 (a pressure deformation part formed by a convex portion 12*b* of the inner case 12) would engage with a hollow 7*g* on an inner circumferential side surface of the case 7*b*. Such assembling finally allows the case 7*b*, the sealing rubber 13, the inner case 12 and the electronic substrate 9 to be formed into one body, so that the electronic substrate 9 does not come off in exchanging a battery.

In the above third conventional example, however, the electronic substrate can be prevented from coming off in exchanging a battery while the following disadvantage may be caused. That is to say, large friction occurs between the protruded portion 13*a* of the sealing rubber 13 and a protruded portion 7*f* of the case 7*b* in fitting the electronic substrate 9 and the inner case 12 into the sealing rubber 13, and thereby, damage such as breakage of a friction part of the sealing rubber 13 may be caused in some cases.

In view of the above, the invention relates to a structure capable of certainly preventing an electronic substrate from coming off in exchanging a battery by disassembling a case and is to provide a transmitter, which allows the structure to be put into practice without causing a complicated manufacturing process and any damage of a sealing rubber.

SUMMARY OF THE INVENTION

A transmitter in accordance with the invention comprises: an upper case having the shape of a box with a bottom; a sealing rubber covering an inner surface of the upper case; an electronic substrate fitted in the sealing rubber; and an inner plate for preventing the electronic substrate from coming off, and the transmitter is characterized in that the inner plate is a component, which has a bending type of unseparated segmentation structure and which is molded into one body, and the inner plate is molded with at least a protruded portion engaging with a groove formed in the inner surface of the upper case and an elastic piece engaging with a periphery of the electronic substrate, and that the bent inner plate is placed on the electronic substrate and a force for canceling the bending state is added so that the protruded portion would engage with the groove of the upper case and the elastic piece would engage with the periphery of the electronic substrate.

Figure 2B:
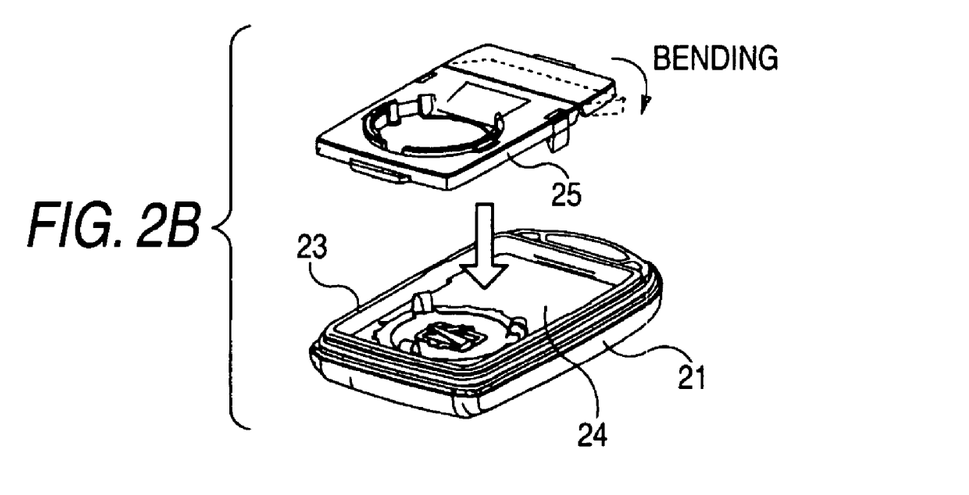
Figure 3A:
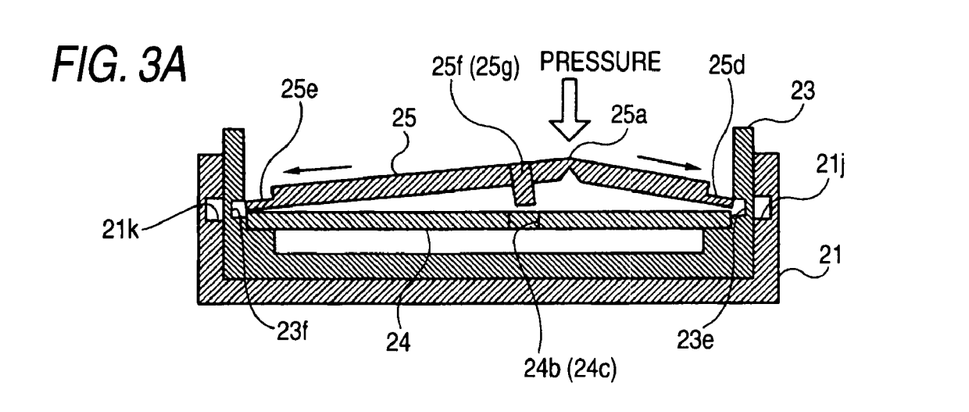
FIG. 3 illustrates an assembling process of the transmitter 20.
Figure 3B:
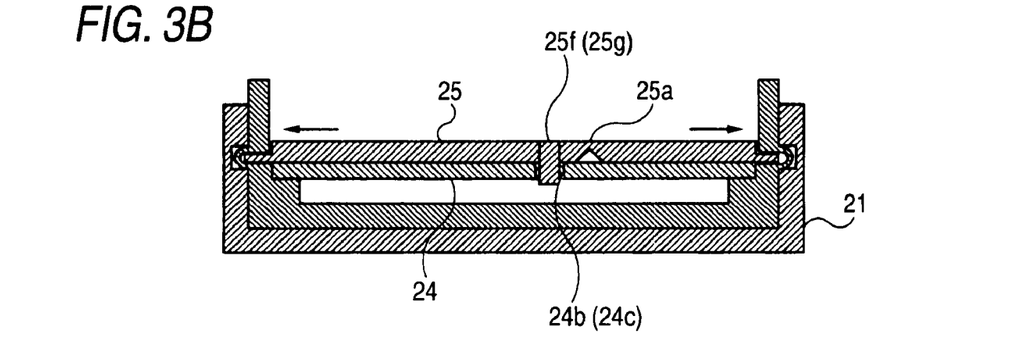

The "bending state" in the above context means a state in which the inner plate is bent into the shape of "V" (see FIGS. 2B and 3A) while the "canceling the bending state" means that the inner plate is changed in shape from the "V" shape to a straight line (see FIG. 3B).

In the invention, only simple operations of bending and placing the inner plate on the electronic substrate and adding a force for canceling the bending state allow the upper case, the sealing rubber and the electronic substrate to be formed into one body.

In accordance with the invention, an upper case, a sealing rubber and an electronic substrate can be formed into one body by means of an inner plate, so that the electronic substrate can be certainly prevented from coming off in disassembling a case for exchanging a battery.

Further, forming the above components into one body is enabled by a simple operation of only adding a predetermined stress on the bent inner plate, and therefore, it does not cause a complicated manufacturing process.

Moreover, the sealing rubber receives no strong friction in forming the above components into one body. Accordingly, the sealing rubber is not likely to be damaged while the waterproof performance is not deteriorated.

DETAILED DESCRIPTION OF THE INVENTION

An embodiment of the invention will be described hereinafter on the basis of the drawings. It should be clearly understood that various detailed specification, illustration and examples of numerals, a series of characters and other marks in the following description are only for reference in order to explain the idea of the invention and all or a part of the above limits no idea of the invention. A well-known method, well-known procedure, well-known architecture, well-known circuitry and such (referred to as "well-known matters", hereinafter) are omitted from detailed description. This is for the purpose of simplifying description and not for the purpose of intentionally eliminating all or a part of the well-known matters. The well-known matters are naturally included in the following description since a person skilled in the art should have known the well-known matters at the time the invention is filed.

Figure 1:
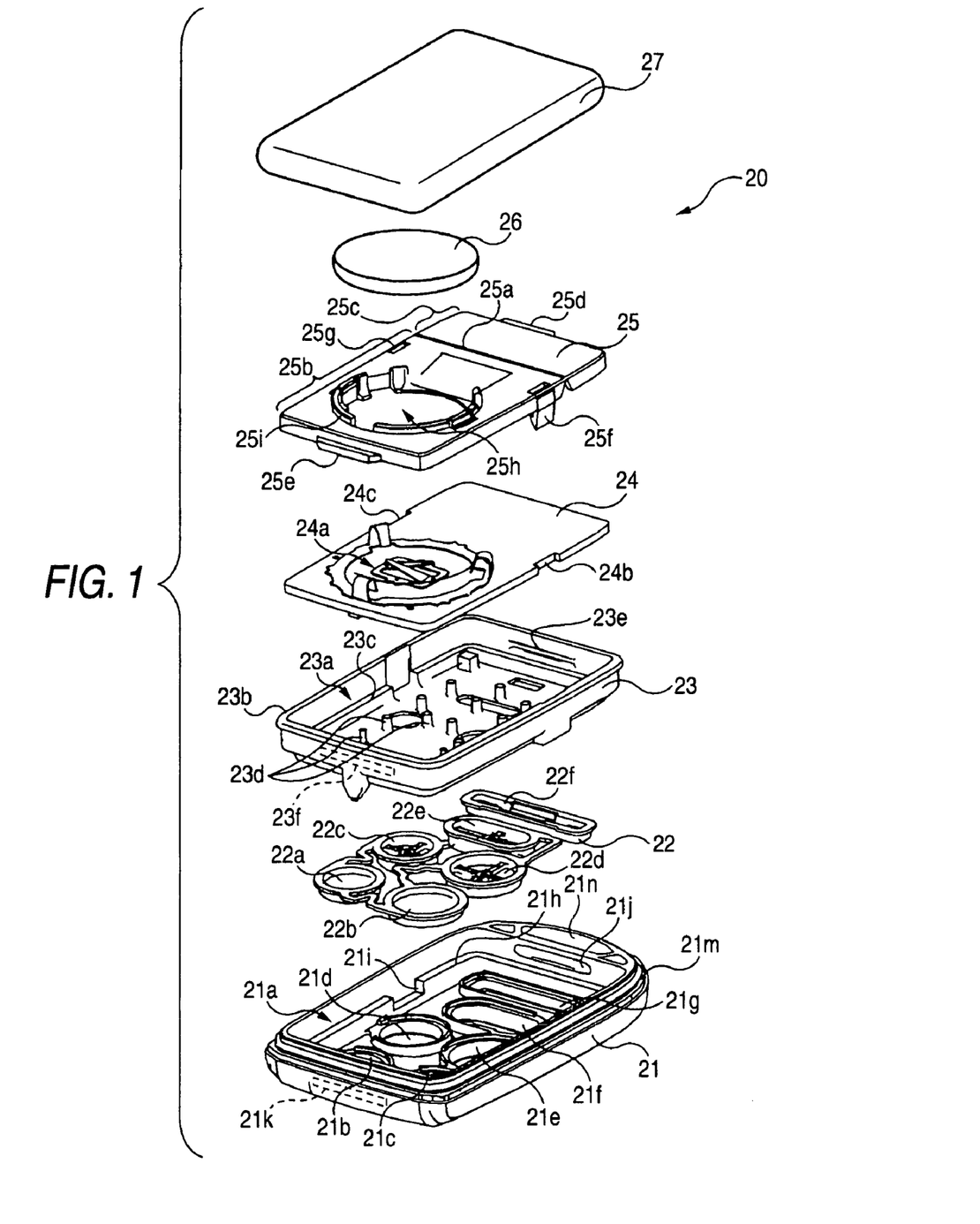
FIG. 1 shows a structure of a transmitter 20 according to the present embodiment.

FIG. 1 shows a structure of a transmitter 20 in accordance with the embodiment. In FIG. 1, the transmitter 20 comprises an upper case 21 shown in the lowest part of the drawing, a button knob 22 mounted on the inner side of the upper case 21, a sealing rubber 23, an electronic substrate 24, an inner plate 25, a battery 26 and a lower case 27 for closing the upper case 21. The word "upper" indicates here a surface for operating a button in using the transmitter 20 (an upward surface, generally) while the word "lower" indicates an opposite surface (a back surface) thereof. The surface for operating a button of the upper case 21 is placed on the operation table or the like in assembling the transmitter 20, as shown in FIG. 1.

Now, respective parts will be described in detail. The upper case 21 is formed into the shape of a box, which has a bottom and whose upper surface is opened and which is as small as a matchbox. The upper case 21 has a space portion 21*a* therein for housing the button knob 22, the sealing rubber 23, the electronic substrate 24, the inner plate 25 and the battery 26. The space potion 21*a* is provided in its bottom surface with a plurality of button holes 21*b* to 21*g*. The space portion 21*a* is further provided at a little bit upper place from the bottom of a side circumference thereof with a step portion 21*h* for mounting the sealing rubber 23 and a notch 21*i* for positioning the sealing rubber 23.

In two side surfaces located on the shorter side edges of the upper case 21 among the four side surfaces of the space portion 21*a*, formed are groove portions 21*j* and 21*k* for locking the inner plate 25, respectively. Furthermore, on the periphery of an opening of the upper case 21, formed all over the periphery is an engaging portion 21*m* for elastically engaging with the lower case 27 while an outward protruded portion is provided in a part of the periphery of the opening to form therein a hole 21*n* for holding a key ring or the like.

The button knob 22 is molded in whole out of a hard elastic body such as hard rubber. The button knob 22 includes push button portions 22*a* to 22*f* respectively corresponding to the plural button holes 21*b* to 21*g* formed in the bottom surface of the space portion 21*g* of the upper case 21. The push button portions 22*a* to 22*f* are exposed outward from the plural button holes 21*b* to 21*g* formed in the bottom surface of the space portion 21*g* of the upper case 21 when the transmitter 20 is completely assembled. A user pushes the push button portions 22*a* to 22*f*.

The sealing rubber 23 is molded out of a soft elastic body such as soft rubber. The sealing rubber 23 includes a substrate housing portion 23*a* in the shape of a box, which has a bottom and whose upper surface only is opened, and a collar 23*b* mounted so as to be pressured between peripheries of the upper case 21 and the lower case 27 in elastic engagement of the upper case 21 and the lower case 27. When the upper case 21 is elastically engaged with the lower case 27, the substrate housing portion 23*a* is intercepted from the air for the purpose of waterproofing.

In a side surface of the substrate housing portion 23*a*, formed is a step portion 23*c* for mounting the electronic substrate 24. In the bottom surface of the substrate housing portion 23*a*, formed is a proper number of column-shaped protrusions 23*d* corresponding to each of the above-mentioned plural push buttons 22*a* to 22*f* of the button knob 22. Further, in two side surfaces located on the shorter side edges of the upper case 21 among the four side surfaces of the substrate housing portion 23*a*, formed are groove portions 23*e* and 23*f* for locking the inner plate 25, respectively.

On the electronic substrate 24, mounted is an electronic circuit necessary for operating the transmitter 20. In the electronic substrate 24, a variety of devices (not shown) such as a semiconductor integrated circuit, a resistance and a capacitor, an electrode portion for a battery 24*a* and push button switches respectively corresponding to the above-mentioned plural push buttons 22*a* to 22*f* of the button knob 22 (which are provided on the back side, and thereby, not shown) are mounted on front and back surfaces of a printed board. Notches 24*b* and 24*c* are respectively formed in the vicinity of a substantial center of longitudinal side surfaces of the electronic substrate 24. Later-mentioned elastic pieces 25*f* and 25*g* formed in the inner plate 25 engage with the notches 24*b* and 24*c*.

The inner plate 25 has an unseparated double segmentation structure in a bending manner. The inner plate 25 is formed into one body in whole from synthetic resin such as ABC resin, polycarbonate, polypropylene and modified PPO, for example. In the embodiment, the inner plate 25 is divided into a first plate portion 25*b* and a second plate portion 25*c* by a thin dividing line portion 25*a*. The two plate portions (the first plate portion 25*b* and the second plate portion 25*c*) are arranged to be able to bend in the shape of "V" at the dividing line portion 25*a*.

In two side surfaces located on the shorter side edges of the upper case 21 among the four side surfaces of the inner plate 25, formed are protruded portions 25*d* and 25*e*, respectively. The protruded portions 25*d* and 25*e* engage with the groove portions 21*j* and 21*k* of the upper case 21 through the groove portions 23*e* and 23*f* of the sealing rubber 23 when the transmitter 20 is completely assembled. Further, in the longitudinal side surfaces of the inner plate 25, respectively formed are the elastic pieces 25*f* and 25*g*, which engage with and hold the notch portions 24*b* and 24*c* provided on the periphery of the electronic substrate 24 when the transmitter 20 is completely assembled. The inner plate 25 is further provided with a hole 25*h* for exposing an electrode in a bottom surface of the battery 26 and a portion 25*i* for positioning and holding a side surface of the battery 26.

Finally, the lower case 27 has a shape almost similar to that of the upper case 21. The lower case 27 is different from the upper case 21, however, at least in that there is no opening other than a lower surface opening.

Figure 2A:
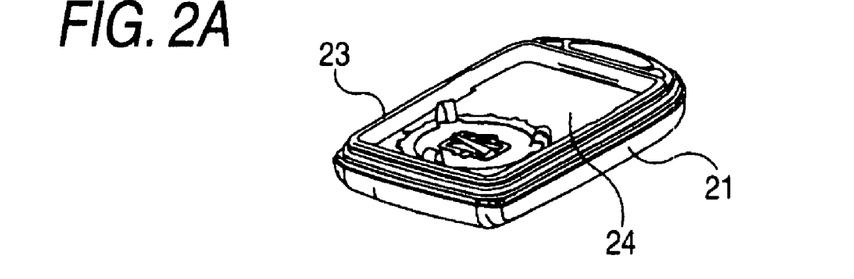
FIG. 2 illustrates an assembling process of the transmitter 20.
Figure 2C:
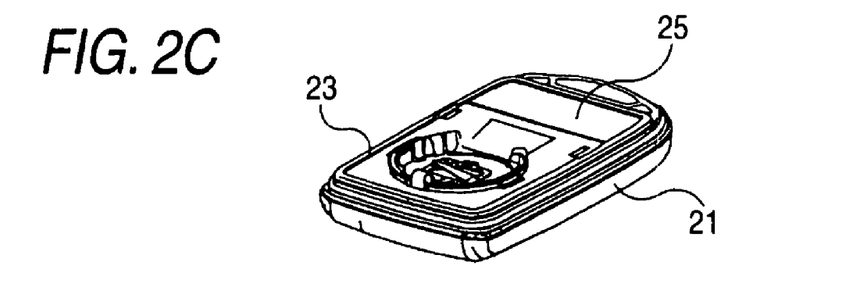

FIGS. 2 and 3 illustrate an assembling process of the transmitter 20. The transmitter 20 is assembled in accordance with the following procedure. First, the upper case 21 is placed on an operation table with the opening surface thereof faced upward. The button knob 22, the sealing rubber 23 and the electronic substrate 24 are mounted in order in the space portion 21*a* of the upper case 21 (see FIG. 2A). The inner plate 25 is then bent into the shape of "V" at the dividing line portion 25*a*, placed on the electronic substrate 24 as it is and thrust with a pressure by means of a finger or such at the dividing line portion 25*a* (see FIGS. 2B and 3A).

The above pressure-thrusting operation causes the inner plate 25 to change in shape so that the first plate portion 25*b* and the second plate portion 25*c* would form a straight line. In a step of completing the change in shape, the protruded portions 25*d* and 25*e* of the inner plate 25 are inserted in the groove portions 21*j* and 21*k* of the upper case 21 through the groove portions 23*e* and 23*f* of the sealing rubber 23 (see FIG. 3B). The inner plate 25 and the upper case 21 (and the electronic substrate 24, the sealing rubber 23 and the button knob 22, which are sandwiched therebetween) are thus formed into one body (see FIG. 2C).

Figure 3C:
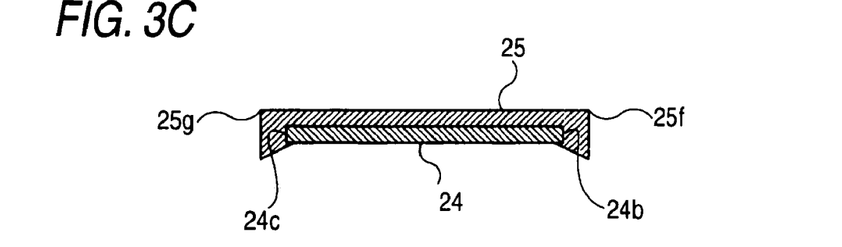

In the step of completing the change in shape from a "V" shape to a straight line, the elastic pieces 25*f* and 25*g* of the inner plate 25 hold the notches 24*b* and 24*c* of the electronic substrate 24 (see FIG. 3C). The inner plate 25 and the upper case 21 (and the electronic substrate 24, the sealing rubber 23 and the button knob 22, which are sandwiched therebetween) are thus kept to be in one body so as not to be separated even after the pressure on the dividing line portion 25*a* of the inner plate 25 is released.

The battery 26 is loaded after the components from the inner plate 25 to the upper case 21 are formed into one body, as described above, and finally, the lower case 27 is elastically fitted in the upper case 21 to complete the transmitter 20.

In view of the above, the following effects can be obtained in accordance with the transmitter 20 in the embodiment.

(1) There is no circular rid for exchanging a battery (see Sign 5 in FIG. 4). Accordingly, free space on the surfaces of the electronic substrate 24 and the lower case 27 is sufficiently secured, so that the freedom for sticking an emblem of a manufacturer, a radio frequency identification sticker or such is large.

(2) The waterproof part is only the peripheries of the upper case 21 and the lower case 27 and certainly sealed by means of the collar portion 23*b* of the sealing rubber 23. This allows a certain waterproof function to be secured.

(3) In exchanging the battery 26, the battery 26 can be easily exchanged only by inserting a coin, a nail and the like in the elastically fitting portion between the upper case 21 and the lower case 27 (the peripheries of the upper case 21 and the lower case 27) for separation and taking off the lower case 27.

(4) In addition to the above, the inner plate 25, the electronic substrate 24, the sealing rubber 23, the button knob 22 and the upper case 21 are kept to be in one body (see FIG. 2C) in exchanging the battery 26, so that the electronic substrate 24 does not come off.

(5) Moreover, the electronic substrate 24 is provided behind the inner plate 25, in other words, the electronic substrate 24 is not exposed. This causes no inconvenience that a person unintentionally touches the electronic substrate 24. Accordingly, an electric trouble (such as insulation defect or rusting due to adherence of finger grease or water) of the electronic substrate 24 can be prevented.

(6) In assembling the transmitter 20, added is a strong force on the groove portions 23e and 23f of the sealing rubber 23 through the protruded portions 25d and 25e of the inner plate 25. A direction in which the force is applied is not a direction in which friction in the above-mentioned third conventional example is generated but a "thickness direction" of the groove portions 23e and 23f of the sealing rubber 23 (see FIG. 3B). Therefore, the sealing rubber 23 is less likely to be broken than the case of the third conventional example and a certain waterproof function can be maintained.

What is claimed is:

1. A transmitter comprising:

an upper case having the shape of a box with a bottom; a sealing rubber covering an inner surface of the upper case; an electronic substrate fitted in the sealing rubber; and an inner plate for preventing the electronic substrate from coming off, wherein the inner plate is a component, which has a bendable shape of unseparated segmentation structure and which is molded into one body, and the inner plate is molded with at least a protruded portion engaging with a groove formed in the inner surface of the upper case and an elastic piece engaging with a periphery of the electronic substrate, and wherein the bent inner plate is placed on the electronic substrate and a force for canceling the bending state is added so that the protruded portion would engage with the groove of the upper case and the elastic piece would engage with the periphery of the electronic substrate, wherein said force for canceling the bending state transforms the inner plate from the bending state into a straight line form, thereby the protruded portion moves in a direction along the straight line to engage with the groove of the upper case, and the elastic piece moves in a direction about perpendicular to the straight line to engage with a groove on the periphery of the electronic substrate.

* * * * *